(12) United States Patent
Ehrlich et al.

(10) Patent No.: US 7,177,110 B2
(45) Date of Patent: Feb. 13, 2007

(54) SYSTEMS AND ROTATABLE MEDIA FOR INCREASING THE USABLE POSITION ERROR SIGNAL (PES) REGION

(75) Inventors: Richard M. Ehrlich, Saratoga, CA (US); Thorsten Schmidt, Milpitas, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 143 days.

(21) Appl. No.: 10/983,448

(22) Filed: Nov. 8, 2004

(65) Prior Publication Data

US 2006/0098327 A1    May 11, 2006

(51) Int. Cl.
*G11B 21/02* (2006.01)
(52) U.S. Cl. ..................................... 360/75
(58) Field of Classification Search .............. 360/55, 360/75, 77.05, 77.07, 77.08, 77.11, 135, 47, 360/77.06, 78.09, 78.06
See application file for complete search history.

(56) References Cited

U.S. PATENT DOCUMENTS

| | | | | |
|---|---|---|---|---|
| 4,484,238 A | * | 11/1984 | Vinal | ............................ 360/47 |
| 5,012,363 A | | 4/1991 | Mine et al. | |
| 5,392,174 A | * | 2/1995 | Suzuki | ..................... 360/78.06 |
| 5,570,247 A | * | 10/1996 | Brown et al. | ................... 360/75 |
| 5,691,857 A | * | 11/1997 | Fitzpatrick et al. | ....... 360/77.06 |
| 5,771,131 A | | 6/1998 | Pirzadeh | |
| 5,907,450 A | * | 5/1999 | Ishikawa | .................. 360/78.09 |
| 5,940,240 A | | 8/1999 | Kupferman | |
| 5,946,158 A | | 8/1999 | Nazarian et al. | |
| 5,949,603 A | * | 9/1999 | Brown et al. | ................... 360/75 |
| 6,040,955 A | * | 3/2000 | Brown et al. | ................... 360/75 |
| 6,091,567 A | | 7/2000 | Cooper et al. | |
| 6,304,407 B1 | | 10/2001 | Baker et al. | |
| 6,369,971 B1 | | 4/2002 | Everett | |
| 6,519,107 B1 | | 2/2003 | Ehrlich et al. | |
| 6,760,185 B1 | * | 7/2004 | Roth et al. | ................ 360/77.08 |
| 6,922,304 B2 | * | 7/2005 | Nakagawa | ................ 360/77.08 |

OTHER PUBLICATIONS

Ono, H, "Architecture and Performance of the ESPER-2 Hard-Disk Drive Servo Writer," IBM J. Res. Develop., 37(1):3-11 (1993).

* cited by examiner

*Primary Examiner*—Fred F. Tzeng
(74) *Attorney, Agent, or Firm*—Fliesler Meyer LLP

(57) ABSTRACT

Systems for writing preferred servo patterns, and rotatable storage media including preferred servo patterns, are provided. Systems for controlling write currents to produce servo bursts having a desired width are also provided. In accordance with specific embodiments, the desired burst width is three-fourths of a data track wide. This description is not intended to be a complete description of, or limit the scope of, the invention. Other features, aspects, and objects of the invention can be obtained from a review of the specification, the figures and the claims.

29 Claims, 10 Drawing Sheets

SYSTEMS AND ROTATABLE MEDIA FOR INCREASING THE USABLE POSITION ERROR SIGNAL (PES) REGION

CROSS REFERENCE TO RELATED APPLICATIONS

The present application is related to commonly assigned U.S. patent application Ser. No. 10/983,376, entitled METHODS FOR INCREASING THE USABLE POSITION ERROR SIGNAL (PES) REGION, which was filed the same day as the present application, and which is incorporated herein by reference.

FIELD OF THE INVENTION

The present invention relates generally to rotatable media data storage devices, such as hard disk drives.

BACKGROUND OF THE INVENTION

Advances in data storage technology have provided for ever-increasing storage capability in devices such as DVD-ROMs, optical drives, and disk drives. In hard disk drives, for example, the width of a written data track has decreased due in part to advances in reading, writing, and positioning technologies. Narrower data tracks result in higher density drives, which is good for the consumer but creates new challenges for drive manufacturers. For example, as data tracks are narrowed, so are the read elements used to read the tracks. However, as read elements become narrower, and previously-used head-width tolerances become more difficult to achieve, controlling position error signal (PES) linearity becomes more difficult. Accordingly, it is desirable to provide for PES linearity improvements, e.g., by increasing the useable PES region.

SUMMARY OF THE INVENTION

Figures 1A, 1B:
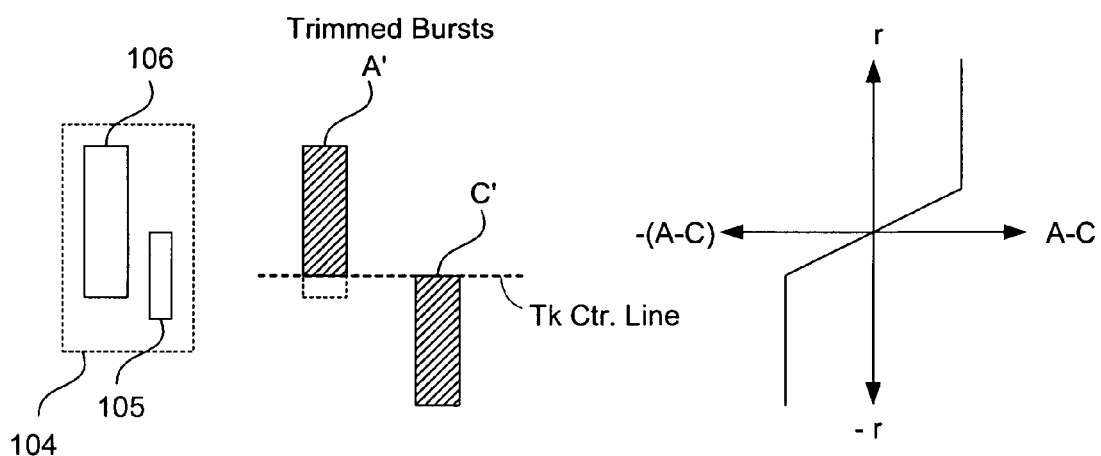
FIG. 1A is a schematic representation of an MR read element juxtaposed next to two radially offset, radially trimmed bursts.
FIG. 1B is a graph of burst amplitude difference as a function of MR read-element radial displacement from a burst-established track centerline for the FIG. 1A trimmed burst pattern.

Some embodiments of the present invention are directed to methods for selecting write elements, that can be used in a media-writer, for writing servo burst patterns that have a desired width. Embodiments of the present invention are also related to servo writers that produce servo burst having a desired width.

In accordance with embodiments of the present invention, a desired servo burst width is equal to three-fourths of a track width. In accordance with embodiments of the present invention, the servo bursts are untrimmed. The servo burst patterns, according to embodiments of the present invention, preferably provide for an increased useable position error signal (PES) region.

Embodiments of the present invention also relate to producing servo bursts having a desired width by controlling a write current provided to a write element. The write current can be controlled within a media writer, in accordance with embodiments of the present invention. In other embodiments, a servowriter controls the write current. In still other embodiments, the write current is controlled during self servo writing. Embodiments of the present invention also relate to preferred servo burst patterns.

Embodiments of the present invention also relate to rotatable storage media (e.g., disks) that include preferred servo burst patterns. In accordance with certain embodiments of the present invention, the preferred servo burst patterns include untrimmed servo bursts that are substantially three-fourths of a desired data track width in radial extent. Embodiments of the present invention also relate to methods for producing preferred servo burst patterns, as well as systems that include rotatable storage media including preferred servo burst patterns.

This summary is not intended to be a complete description of, or limit the scope of, the invention. Further embodiments, features, aspects, and advantages of the present invention will become more apparent from the detailed description set forth below, the drawings and the claims.

DETAILED DESCRIPTION OF THE INVENTION

The information stored on a disk can be written in concentric tracks, extending from near the inner diameter of the disk to near the outer diameter of the disk. In an embedded servo-type system, servo information can be written in servo wedges, and can be recorded on tracks that can also contain data. In a system where an actuator assembly arm rotates about a pivot point such as a bearing, the servo wedges may not extend linearly from the inner diameter (ID) of the disk to the outer diameter (OD), but may be curved slightly in order to adjust for the trajectory of the head as it sweeps across the disk.

The servo information often includes bursts of transitions called "servo bursts," a group of which can be used to form a burst pattern. The servo information can be positioned regularly about each track, such that when a head reads the servo information, a relative position of the head can be determined that can be used by a servo processor to adjust the position of the head relative to the track. For each servo wedge, this relative position can be determined in one example as a function of the target location, a track number read from the servo wedge, and the amplitudes or phases of the bursts, or a subset of those bursts. The signal that is indicative of the position of a head or element, such as a read/write head or element, relative to the center of a target track, will be referred to herein as a position-error signal (PES).

For example, a centerline for a given data track can be "defined" relative to a series of bursts, burst edges, or burst boundaries. The centerline can also be defined by, or offset relative to, any function or combination of bursts or burst patterns. This can include, for example, a location at which the PES value is a maximum, a minimum, or a fraction or percentage thereof. Any location relative to a function of the bursts can be selected to define track position. For example, if a read element evenly straddles an A-burst and a C-burst, or portions thereof, then servo demodulation circuitry in communication with the read element can produce equal amplitude measurements for the two bursts, as the portion of the signal coming from the A-burst above the centerline is approximately equal in amplitude to the portion coming from the C-burst below the centerline. The resulting computed PES can be zero if the radial location defined by the A-burst/C-burst (A/C) combination, or A/C boundary, is the center of a data track, also known as a track centerline. In such an embodiment, the radial location at which the PES value is zero (e.g., where A−C=0) can be referred to as a null-point. Null-points can be used in each servo wedge to define a relative position of a track. If the head is too far towards the outer diameter of the disk, or above the centerline, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of bursts defining the shape of that track about the disk. Exemplary track centerlines are discussed in more detail below with reference to FIGS. 1A and 1B. It is noted that a burst labeled "C" in this application, which is generally 180 degrees out of phase from an "A" burst, may in some other documents and patents be referred to as a "B" burst. Accordingly, the present invention should not be limited by the specific choice of labeling servo bursts.

The PES scheme described above is one of many possible schemes for combining the track number read from a servo wedge and the phases or amplitudes of the servo bursts. Many other schemes are also possible.

A disk drive can have tens of thousands of data tracks, with each track including embedded servo information or patterns. There are numerous techniques for writing these servo patterns, some of which are discussed below. One such technique uses a media-writer, which is well known in the art, to write servo patterns on a stack of disks. Each disk is then placed in a separate drive containing multiple blank disks, such that the drive can use the patterned disk as a reference to re-write servo patterns on all of the other disk surfaces in the drive, as well as writing a servo pattern on the patterned surface, if desired. It is also possible that the media writer is used to write the final patterns on the disk surface (s). Such disks can then be placed in disk drives and used "as is" (i.e., without re-writing of servo patterns). Media-writers are relatively expensive instruments, and they may take a long time to write a reference pattern or final pattern on a stack of disks. However, if the stack contains ten blank disks, for example, then the media-writer can write the reference pattern for ten drives in approximately the same time that it would have taken to servowrite a single drive. If a servo-pattern thus produce is used as a reference surface for self-servowriting of that and/or other surfaces in the driver, this scheme is a member of a class of self-servowriting techniques commonly known as "replication" self-servowriting.

A typical replication process, in which a drive servos on the reference pattern and writes final servo patterns on all surfaces, takes place while the drive is in a relatively inexpensive test-rack, connected to only a power-supply. The extra time that it takes is therefore usually acceptable.

Another class of self-servowriting techniques is known as "propagation" self-servowriting. Schemes in this class differ from those in the "replication" class in the fact that the wedges written by the drive at one point in the process are later used as reference wedges for other tracks. These schemes are thus "self-propagating". Typically, such schemes require a R/W head that has a large radial offset between the read and write elements, so that the drive can servo with the read element over previously-written servo wedges while the write element is writing new servo wedges. In one such application, a servowriter is used for a short time to write a small "guide" pattern on a disk that is already assembled in a drive. The drive then propagates the pattern across the disk. In this type of self-servowriting operation, previously written tracks can later serve as reference tracks.

As described in U.S. patent application Ser. No. 10/923, 662, entitled SYSTEMS AND METHODS FOR REPAIRABLE SERVO BURST PATTERNS filed Aug. 20, 2004, which is incorporated herein by reference, many self-servowriting techniques require a three or more step-per-track servowriting process to provide a more linear (or at least, a linearizable) PES at all locations along a track. As will be described below, specific embodiments of the present invention enable servo burst patterns to be written during a two-step-per-track servowriting process (also known as a two-pass-per-track scheme), which is preferred to a three or more-step-per-track scheme, because the less steps per track, the faster the servo information can be written onto a disk.

As explained in U.S. Pat. No. 6,519,107, which is incorporated herein by reference, an initial issue confronting a disk drive designer is whether to employ "trimmed bursts" or "untrimmed bursts". A trimmed servo burst is one in which a radial edge of the burst is DC erased during a subsequent pass of the write element at a displaced radial position relative to the disk. A trimmed burst pattern is shown in FIG. 1A wherein a servo burst A' has a lower radial edge which has been trimmed (the portion of the A' burst enclosed in the dashed line block has been DC erased) to be in approximate alignment with the upper radial edge of an adjacent burst C'. The bursts A' and C' are written using a R/W head 104, which includes a write element 106 and a magneto-resistive (MR) read element 105. It is possible to trim a previously written burst, such as burst A' during a single pass of the write element 106 along a servowriting path for writing the C' burst. However, it has been discovered that a repeatable runout error (RRO) can be reduced by a factor of about the square root of two when an untrimmed burst pattern is used in lieu of a single-pass-trimmed burst pattern. It is believed that the burst null point for an untrimmed burst pattern is determined by non-repeatable runout error (NRRO) of two different servowriting passes (one pass for each burst written), while the burst-null-point for a trimmed pattern as shown in FIG. 1A is determined by the NRRO of a single pass (wherein the write element trims one burst and writes another burst). While the FIG. 1A trimmed-burst pattern could be written in a way to reduce its RRO by the square root of two factor by requiring two passes for each burst: one pass to trim the previous burst and a second pass to write the burst, such an approach, if executed on a servowriter or media-writer, would nearly double the servowriting time.

FIG. 1B graphs a PES which is linear as a function of radial offset of the MR read element 105 about a centerline (A–C) passing through the approximately aligned edges of the A' and C' trimmed bursts. If the write element 106 is about one track wide, then the PES linearity signal should be about the same for trimmed or untrimmed servo bursts. However, for write elements, which have electrical writing widths greater or less than about one track width, the useable portion of the PES curve is larger for untrimmed bursts. FIGS. 1A and 1B show the A'–C' PES as a function of radial displacement of the MR read element 105 for the two trimmed bursts A' and C'. The idealized curve presented as FIG. 1B has a linear portion, bounded on both sides by flat lines. The useable portion of the FIG. 1B curve is simply the linear portion of the curve.

Figures 2A, 2B:
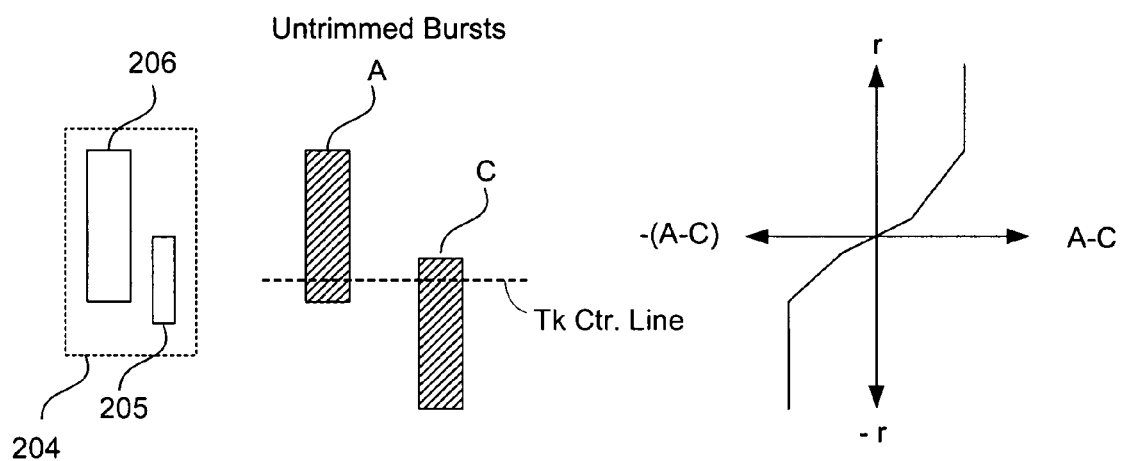
FIG. 2A is a schematic representation of an MR read element juxtaposed next to two radially offset, untrimmed bursts.
FIG. 2B is a graph of burst amplitude difference as a function of MR read-element radial displacement from a burst-established track centerline for the FIG. 2A untrimmed burst pattern.
Figure 3:
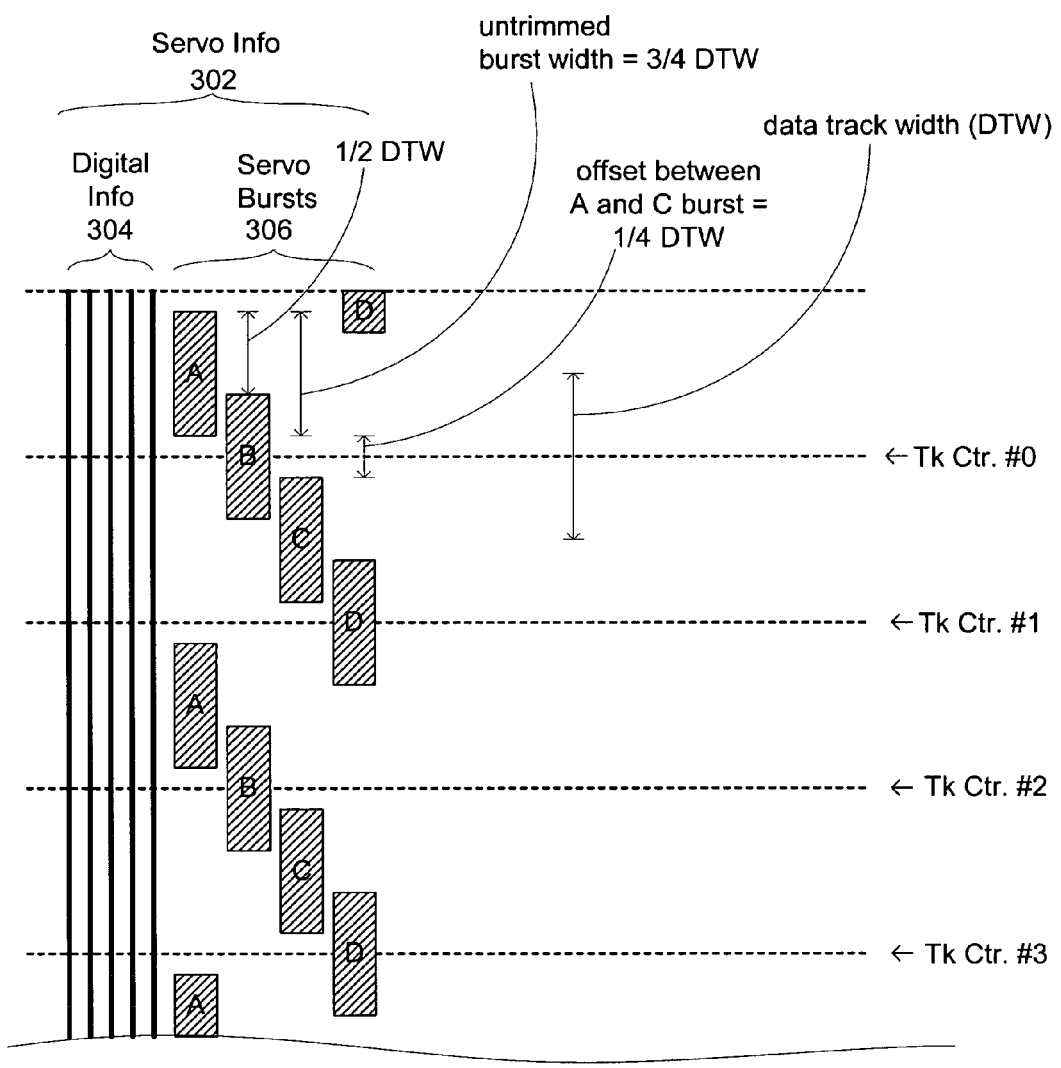
FIG. 3 is a greatly enlarged, planarized diagrammatic plan of a two-step-per-data-track (also known as two-pass-per-data track) untrimmed reference servo burst pattern, according to an embodiment of the present invention.

FIGS. 2A and 2B show an equivalent situation for untrimmed bursts A and C, written using a R/W head 204, which includes a write element 206 and a read element 205. The linear portion of the FIG. 2B curve, centered about A–C=0, is smaller than that of the trimmed burst pattern, but the useable, non-flat portion of the FIG. 2B curve extends over a larger radial displacement of the MR read element 205 relative to the disk. If a PES linearization method is used to re-linearize the PES within the drive servo loop, then the FIG. 2A untrimmed burst pattern has a larger useable region. An exemplary manufacturing process for determination of a PES linearization table, which is disclosed in U.S. Pat. No. 6,369,971 (Everett), is incorporate by reference. Other PES linearization schemes are also available, such as, but not limited to, those disclosed in U.S. Pat. No. 5,982,173 (Hegan). While FIGS. 2A and 2B show overlapped untrimmed A and C bursts, similar reductions in the RRO and increases in the non-flat usable PES region are achieved if the untrimmed A and C bursts underlap (e.g., as shown in FIG. 3, discussed below).

Preferred Burst Patterns

In accordance with embodiments of the present invention, a preferred servo burst width for a two-step-per-data track (also known as two-pass-per-track) untrimmed burst pattern is three-fourths of a desired data track width (DTW). Embodiments of the present invention are also directed to systems and methods for efficiently writing servo burst patterns that have the preferred burst widths.

One way to write burst patterns having a desired burst width (e.g., the preferred burst width) is to use a write element having a width that, given a predetermined write current, will produce burst widths that are substantially equal to the desired burst width. However, as a practical matter, the manufacturing of write elements will produce write elements having a distribution of widths. In other words, even after an optimum write element width is determined, there is currently no efficient manufacturing technique that will ensure that all or most of the write elements that will be manufactured will have the optimum width. For example, even if write elements were specifically manufactured with the goal of producing burst widths that are three-fourths of a data track wide, for a given write current, it is possible that only about 10% of the manufactured write elements will achieve this very tight tolerance. Clearly, it would be too costly to dispose of the other 90% of the write elements that do not satisfy the tight tolerance. Even if the situation were reversed (so that 90% of the manufactured write elements were very near to the desired width), this would result in 10% of all 1-head drives having that head being out of tolerance. Worse yet, roughly 19% of all 2-head drives would contain at least one out-of-tolerance head (and so on for drives using more than two heads). Even a 10% yield-reduction would not be tolerable for a high-volume, low-cost drive.

In accordance with an embodiment of the present invention, write elements are measured and/or tested so that write elements producing a desired burst width (e.g., three-fourths of a data track wide) can be identified and singled out. These ideal or near ideal write elements are then used in one or more media-writers to write final servo patterns on disks. As explained above, media-writers are relatively expensive to start with. Further, there will be relatively few media-writers as compared to the number of disk drives produced using the media-writers. Thus, a disk manufacturer can rationalize selecting and using the ideal or near ideal write elements in the media-writers.

FIG. 3 is a greatly enlarged, planarized diagrammatic plan view of a two-step-per-data-track (also known as two-pass-per-data-track) untrimmed servo burst pattern, according to an embodiment of the present invention. The servo burst pattern 306 of FIG. 3 can be produced using a write element that, for a given write current, produces servo bursts that are three-fourths of a data track width. In accordance with another embodiment of the present invention, servo bursts that are three-fourths of a data track width can be produced by appropriately adjusting the write current. A further embodiment combines these two ideas. The data track width (DTW), which is also known as a data track pitch, is defined as the distance between two data track center lines. Since data track centerlines are in actuality defined by servo bursts (or distances between bursts), a data track width (DTW) is actually defined by the servo bursts. Accordingly, when referring to bursts as they are being written, it is more accurate to say that the untrimmed servo bursts, in accordance with an embodiment of the present invention, are three-fourths of a desired DTW (since there is no DTW until after the servo bursts are written). The desired DTW is likely predetermined. An exemplary DTW is 0.25 µm. This is just an example that is not meant to be limiting. Other data track widths are also within the spirit and scope of the present invention. It is also within the scope of the present invention for the desired DTW to vary for different positions along a stroke the disk drive (i.e., depend upon the position along the stroke).

As shown in FIG. 3, the servo burst pattern 306 includes four untrimmed servo bursts A, B, C and D. The A, B, C and D bursts are written in two steps (also known in the art as two passes) per data track, with the write element moving one-half of the desired DTW during successive steps (i.e., the write element moves in one-half track pitch steps). A two-step-per-track (also known in the art as two-passes-per-track) scheme is preferred to a three-step-per-track (also known in the art as three-pass-per-track) scheme, because the less steps per track, the faster the servo information can be written onto a disk.

The servo bursts A, B, C and D are not trimmed (i.e., are un-trimmed), thereby reducing RRO and/or the amount of time necessary to write the bursts. The track centerline can be followed, e.g., by tracking where A−C=0. Where B−D=0 can be used to indicate one-half of the DTW above or below the track centerline, which are the track's radial edges. Such information can be useful when attempting to compensate for the write-to-read offset associated with most heads, or during seeking operations. The track center lines and radial edges can be defined in other manners, as explained below.

It can be observed from FIG. 3 that none of the burst edges are aligned with a data track centerline (assuming the dashed horizontal lines represent the track center lines). It can also be observed that an A-burst and a C-burst do not overlap, and a B-burst and a D-burst do not overlap. Rather, the A-burst and the C-burst underlap each other by one-fourth (¼) of a DTW. In other words, the lower burst edge of the A-burst is separated (i.e., offset) from the upper edge of the C-burst by one-fourth of a DTW, with each burst being on opposite sides of a data track centerline, enabling a read element to servo where A=C (i.e., the data track centerline can be where A−C=0). Similarly, the lower burst edge of a B-burst is separated from the upper edge of a D-burst by one-fourth of a DTW, with the B burst straddling one track centerline (e.g., Tk Ctr. # 0), and the D-burst straddling an adjacent track centerline (e.g., Tk Ctr. #1), enabling half tracks to be identified (i.e., half way between two adjacent track centerlines can be where B−D=0).

As can also be observed from FIG. 3, adjacent bursts overlap one another by one-fourth (¼) of a DTW, and upper edges (or lower edges) of adjacent bursts are one-half (½) of a DTW separated from one another. For example, an A-burst and adjacent B-burst overlap by one-fourth of a DTW, and the upper edge of the A-burst is separated from the upper edge of the B-burst by one-half of a DTW. Such a burst arrangement allows for good position information at all points (i.e., locations) across a track (so long as the reader width is significantly greater than 25% of a DTW)

Embodiments of the present invention include methods and system for producing the untrimmed servo burst pattern of FIG. 3. Embodiments of the present invention are also directed to rotatable media (e.g., disks) that include the untrimmed servo burst pattern of FIG. 3., as well as systems (e.g., disk drives) that include such rotatable media. This will be further appreciated from the discussion below.

Figure 4A:
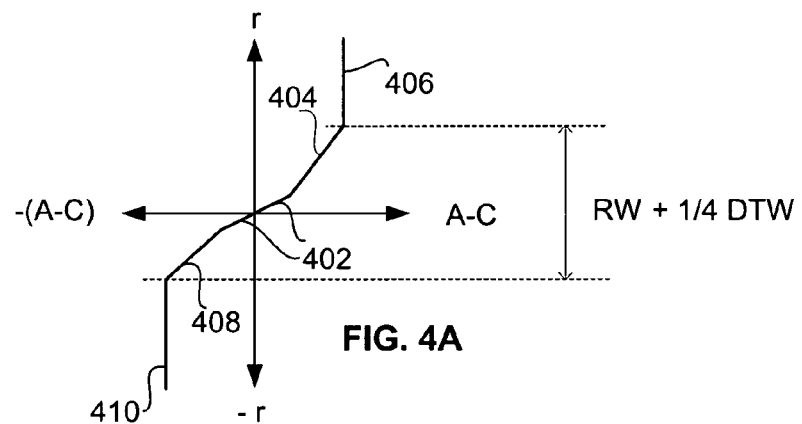
FIG. 4A is a graph of burst amplitude difference as a function of MR read-element radial displacement from a burst-established track centerline for the untrimmed burst pattern of FIG. 3.

FIG. 4A shows an exemplary PES curve that can be obtained using the burst pattern shown in FIG. 3. Assume the slope of the PES curve is defined as a change in burst difference over a change in radial position (i.e., slope=Δ(A−C)/Δr). Also assume that the PES curve is useful (for determining the radial locations of a read element) as long as the slope of the PES curve is not flat (zero or infinite slope).

Figure 4B:
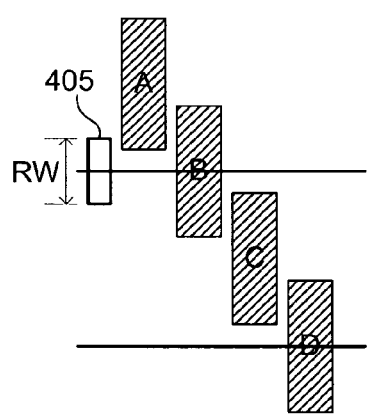
FIGS. 4B–4F are useful for explaining how portions of the curve in FIG. 4A correspond to different radial positions of a read element.
Figure 4C:
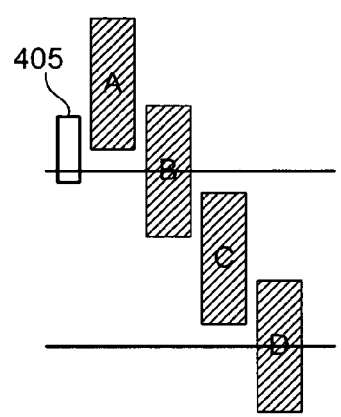
Figure 4D:
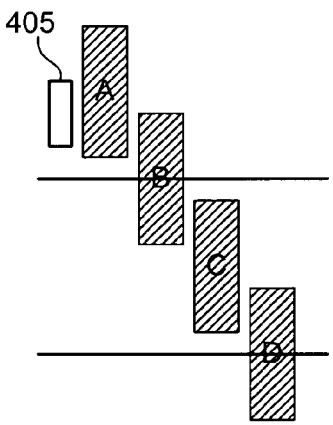
Figure 4E:
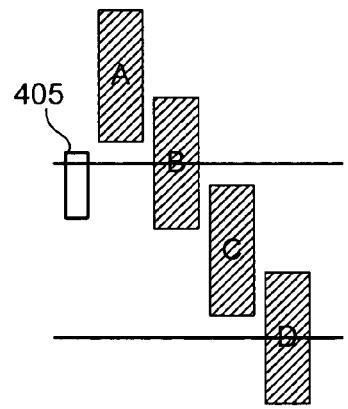
Figure 4F:
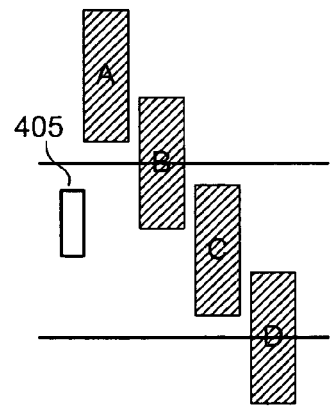

Looking at the PES curve in FIG. 4A, the portion 402 of the curve corresponds to those radial positions along the track where a read element (labeled 405 in FIGS. 4B–4F) reads portions of both the A burst and the C burst, e.g., as shown in FIG. 4B. The portion 404 of the curve, where the defined slope becomes steeper, corresponds to those radial positions along the track where the read element 405 reads the A burst, without reading the C burst, but the read element 405 overlaps the gap between the A and C bursts, e.g., as shown in FIG. 4C. The portion 406 of the curve is where the read element 405 is encompassed by the A burst, e.g., as shown in FIG. 4D, causing the slope to become flat. On the other end of the curve, the portion 408 of the curve is where the read element 405 reads the C burst, without reading the A burst, but the read element 405 overlaps the gap between the A and C bursts, e.g., as shown in FIG. 4E. The portion 410 of the curve is where the read element 405 is encompassed by the C burst, e.g., as shown in FIG. 4F, causing the slope to become flat.

For a given read element width (RW), it is desirable to have the usable portion of a PES curve be as large as possible. As shown in FIG. 4A, by using the burst pattern of FIG. 3, the usable portion of the PES curve is equal to RW plus one-fourth of a DTW. More specifically, as can be appreciated from FIGS. 4A–4F, the read element 405 can go ½ RW+⅛ DTW above a track center line, and ½ RW−⅛ DTW below a track center line before the slope becomes zero (assuming the slope is defined as Δ(A−C)/Δr), resulting in a useful region equal to RW+¼DTW. It is also desirable the read element "see" two bursts edges when it is close to the write center line, resulting in lower RRO and PES noise when writing.

Assuming that a useful PES is required at all points along a track, a servo burst pattern can define how narrow the width of a read element (RW) can be. Preferably, a burst pattern will allow for as narrow a read element as possible, thereby allowing as large a range of read element widths (RWs) as possible (and thereby, providing more relaxed tolerances to the vendors of the heads). In other words, if a useful PES can be obtained from a larger range of read element widths, then the head vendors will be allowed more leeway when manufacturing the heads. Further, using a narrow read element is advantageous when reading non-servo information, i.e., when reading user data. This is because if the read element is significantly smaller than the write element used to write the user data, then more radial displacements (e.g., track mis-registration) can be tolerated during both writing and reading of data without the displacements adversely affecting reading of the data. However, there is a limit to how narrow a read element can be, which is the point at which the read element is so narrow that a useful PES can not be obtained. Another limit would be the width below which the user-data readback signal is too low to permit low-error-rate reading of the user data. Using the burst pattern of FIG. 3, it is believed that a read element as narrow as three-eighths of a DTW can be used (i.e., RW≧⅜ DTW).

While burst pair differences (e.g., A−C, and B−D) can be used for tracking centerlines and determining other positions across a track, the present invention is not meant to be limited in this manner. Rather, numerous other position schemes have been developed (and may be further developed) that use more than two bursts (e.g., three or four bursts) to determine radial position. It is within the spirit and scope of the present invention that such other position schemes can be used with the burst pattern of FIG. 3. For example, the centerline can also be defined by, or offset relative to, any function or combination of bursts or burst patterns. This can include, for example, a location at which the PES value is a maximum, a minimum, or a fraction or percentage thereof. In other words, any location relative to a function of the bursts can be selected to define track position.

As mentioned above, one way to write burst patterns that have a desired width (e.g., three-fourths of a desired DTW) is to identify, through measurements and/or tests, write elements having a width that, given a predetermined write current, will produce burst widths that are substantially equal to the desired burst width. A disk manufacturer can rationalize selecting and using the ideal or near ideal write elements in media-writers, because media-writers are expensive and relatively few are required to produce large quantities of disk drivers.

Figure 5A:
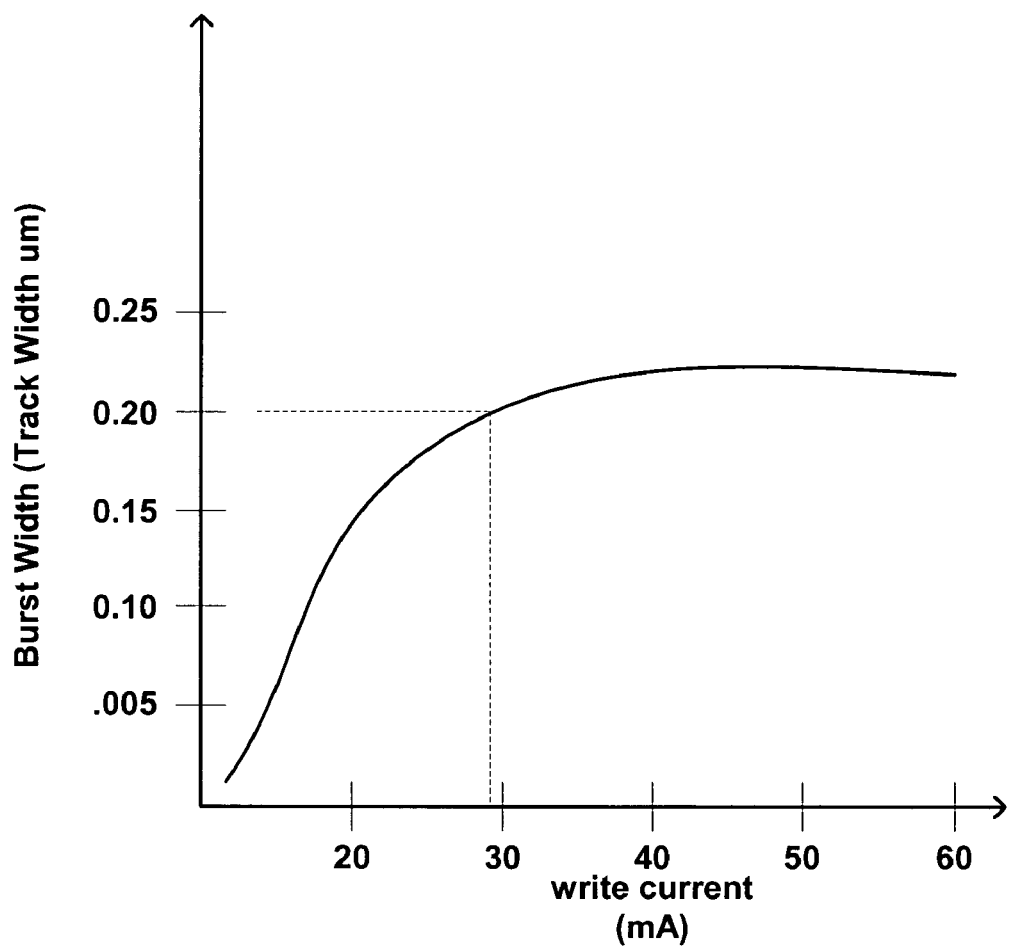
FIG. 5A is an exemplary plot showing the variation of burst width as a function of write-current for a write element.

As also mentioned above, in accordance with another embodiment of the present invention, a write current can be selected such that a non-ideal write element produces burst widths that are substantially equal to the desired burst width. As shown in the exemplary graph of FIG. 5A, the written burst width produced by a write element varies with write current. The dashed line in FIG. 5A illustrates how a write current can be selected to produce a burst width that is three-fourths (i.e., 75%) of a desired DTW. A table or graph similar to FIG. 5A can be produced for each write element (e.g., during calibration), and then a precise write current can be selected to achieve desired burst widths. The precisely selected write current can be used to produce final burst patterns in a media-writer (i.e., the write currents of write elements in media-writers can be controlled to produce the desired servo burst width). In accordance with another embodiment of the present invention, a precisely selected write current is used to produce the desired servo burst width (BW) during servo-writing performed by a servowriter (e.g., in a clean room). In still another embodiment, a precisely selected write current is used to produce the desired servo burst width during self-servo writing.

Various calibration procedures can be used to calibrate a write element. In accordance with an embodiment of the present invention, a write element can be calibrated in order to determine the width of a burst written by the write element as a function of write current. The location of a write element can be determined by observing a reference pattern. Such reference patterns can include, but are not limited to, patterns written to one surface of a rotatable media by a media-writer, printed-media patterns, or portions of final servo patterns written by a drive during an earlier portion of an ongoing self-servowriting operation. Calibrated quantities can vary from element to element, and from drive to drive. Write widths can also vary, for example, as a function of radius skew angle of the head and/or temperature, such that it may not be enough to simply calibrate a write element by varying write current. If a drive or test-process setup does not include the capability to measure temperature, it may be necessary to operate with a relatively steady power-draw for long enough to attain a steady-state temperature. The calibrated write width as a function of head-number, write-current, temperature, skew angle and radius can be recorded for later use. This information can be stored, for example, in memory resident in a drive or on the drive itself in a reserved location.

One such calibration process that can be used with embodiments of the present invention utilizes a DC-erase space in the data-area, between servo samples that are used to control the position of a R/W head during this test. A field can be written into this erased space that looks like a servo burst using a specific write-current ($I_0$). A "track-profile" of the burst can be determined, such as by scanning the R/W head radially across the written burst, and measuring the burst amplitude as a function of radial position. The burst amplitude can be measured using whatever circuitry and technique the servo normally uses to demodulate servo bursts. The burst could be written immediately after the bursts normally used by the servo, and the servo demodulation circuitry could be re-programmed to demodulate the burst as if it were an extra servo burst. That burst value may not be used by the servo for controlling the position of a R/W head, but only for calibration purposes. The measured profile, which can be a function of the writer width, the write-current, the reader width, and radius, as well as possibly the media properties and temperature, will typically have a rising portion (as the reader approaches the written burst), a relatively flat portion (where the reader is entirely contained within the written burst), and a falling portion (where the reader is getting out from under the written burst).

These steps can then be repeated using a different write-current ($I_1$). If $I_1$ is larger than $I_0$, then the measured profile should be wider than the original profile. It is likely that the wider profile will have rising and falling portions that are essentially parallel to those of the original burst, but displaced in position. The difference in position of the rising and falling portions of the profile can be recorded as a function of the write current. A table can be constructed that associates the variation of the location of the edges of written bursts (i.e., the displacement of the rising or falling portion of the track profile) with write-current. This process can be repeated at several radial locations for each R/W head. Such a table can be used later, e.g., during a self-servowriting process. The drive can use an interpolation scheme to determine the variation of burst-width with write-current using the data in the table. Such a table can alternatively be produced and used by a media-writer or servowriter.

Knowing the calibrated write width as a function of write-current (as well as other possible variables) allows a media-writer, servo-writer, or drive (during self servo writing) to produce servo bursts having a desired width (e.g., three-fourths of a DTW), in accordance with embodiments of the present invention.

Figure 5B:
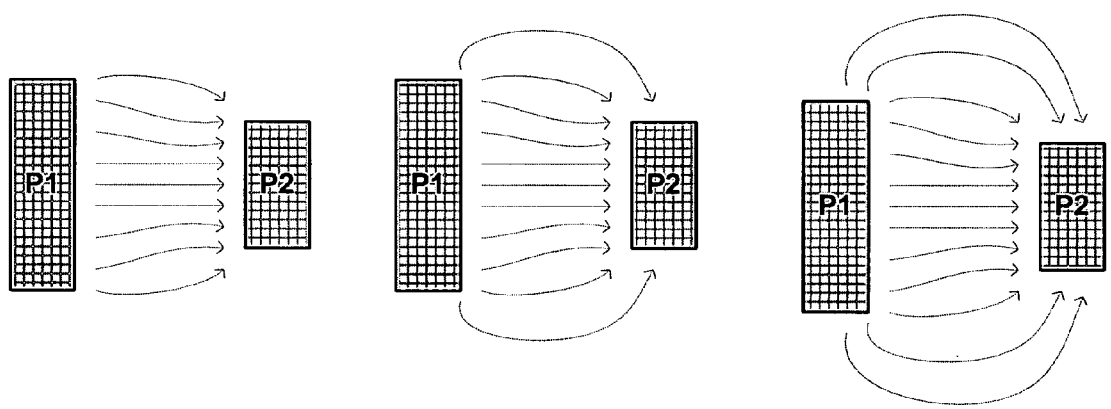
FIG. 5B is a diagram schematically illustrating how a write-head's magnetic field lines beyond a specified field-strength vary with write current.

The illustrations in FIG. 5B are intended to show how magnetic field lines change with write current. Exemplary field line diagrams are shown for three different write currents, with the lowest write current represented in the left most sub-figure and the greatest write current represented in the right most sub-figure. At each current, the flux lines are shown passing from a first pole (P1) to a second pole (P2) of the write element. As shown in FIG. 5B, the shape of the field lines may not vary significantly with write current as long as the write element is not saturated, only the magnitude of the flux lines. Even if saturation does occur to some extent, however, the written burst width can still rise monotonically with increasing write current. As such, there is a distance from the head at which the write field decays to a low enough level that it is no longer capable of writing to the media. As the write current is increased, the distance from the write element at which the field is large enough to write to the media increases as well. The width of the written bursts therefore can be seen to rise as a function of the write-current. An illustrative plot of how that burst width (BW) can vary as a function of write current for a given write element is shown in FIG. 5A, which was discussed above. Still referring to FIG. 5B, to the extent that the write element acts in a linear fashion (which is limited, but worth talking about), the field line shapes, themselves, do not change. Rather, the field-strengths just grow in proportion to the applied write current. Thus, as the write current is increased, the regions in which the field-strength is beyond a threshold field-strength (which is large enough to change the magnetization of the media) grows in extent. This is recognizable in FIG. 5B, where the field-lines in the progression of sub-figures are identical to those which are in the same general region as those of an earlier sub-figure, by but with more lines (further out from the poles) as the current grows.

An alternative calibration scheme can be used to determine how the effective centerline of the servowritten track, as determined by the edges of the written bursts, varies with write current. The way in which the centerline of a written track varies with write current can be determined by servowriting a track with different write-currents and measuring the variation of the track-centerline with the write-current. This approach is illustrated in FIG. 6.

Figure 6:
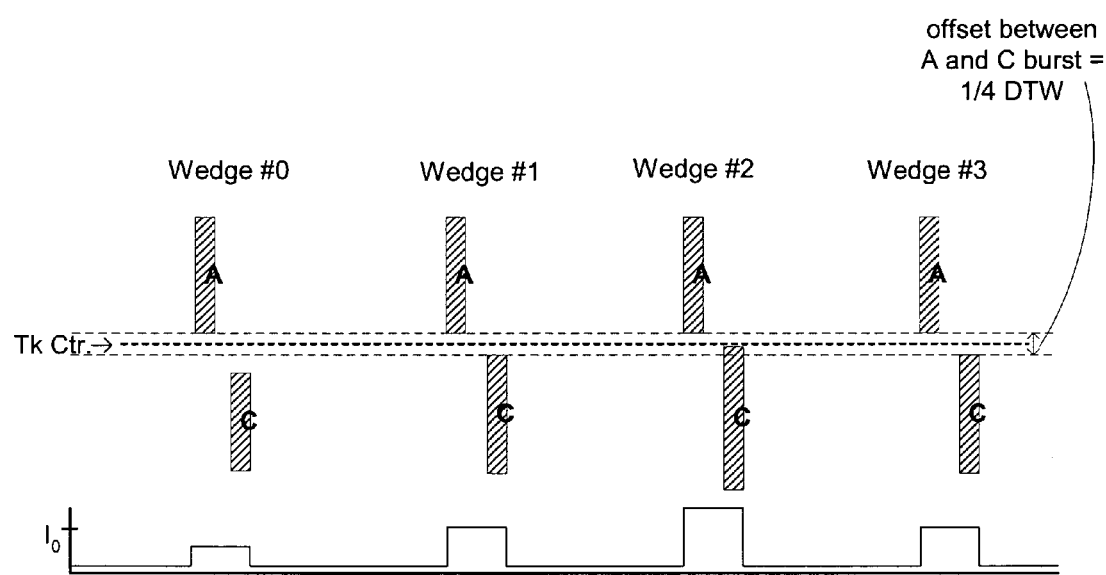
FIG. 6 is a diagram showing a burst pattern that can be used to calibrate a servowriting process in accordance with an embodiment of the present invention.

In FIG. 6, it is assumed for the sake of simplicity that writing with the nominal current would produce untrimmed A and C bursts with the desired spacing (e.g., ¼ DTW underlap). It is also assumed for the sake of simplicity that the A bursts are in the correct position when the C bursts are being written. The write-current can then be intentionally varied from wedge to wedge, in a predetermined fashion, to produce a repetitive misplacement of the C bursts. For example, Wedge #0 in FIG. 6 is written with a smaller-than-nominal write current, such that the upper edge of the C burst is below the desired position. Wedge #1 and wedge #3 are written with nominal write currents, and wedge #2 is written with a larger-than-nominal write current, such that the top edge of the C burst extends above the desired position. The misplacement of the bursts written for wedges 0 and 3 can be determined by servoing on the servowritten track and applying RRO reduction techniques, such as those described in the U.S. patent application Ser. No. 10/923,662, which was incorporated by reference.

In fact, the placement of the upper edge of the C bursts will be non-ideal for reasons other than the fact that servowriting is done with varying write-current. Additionally, the lower edges of the A bursts will in practice not be precisely in the ideal position. Even though an attempt can be made to remove the RRO of the original reference pattern before servowriting, the RRO might not get completely removed. Also, the NRRO that is being rejected can be present during the calibration and "contaminate" the results. The contamination due to RRO in the reference pattern, which is not completely removed by RRO reduction techniques, can be reduced by doing two processes at a time. In a first process, a uniform (nominal) write current can be used to write all wedges. In a second process, the write current can be varied from wedge to wedge in a pre-determined fashion. By comparing the results, or computed track centerline placement, of the two processes, the track centerline displacement can better be determined as a function of write current. In order to remove effects of NRRO on the calibration, the above process can be repeated several times. The results of these process repetitions can then be averaged in order to remove the effects of the random NRRO. While the above procedure involved varying the write current to adjust the upper edge of the C bursts, a similar procedure can be used to vary the lower edge of the A bursts, or to adjust the position of other bursts (e.g., B and D bursts)

Exemplary Media-Writer

Figure 7:
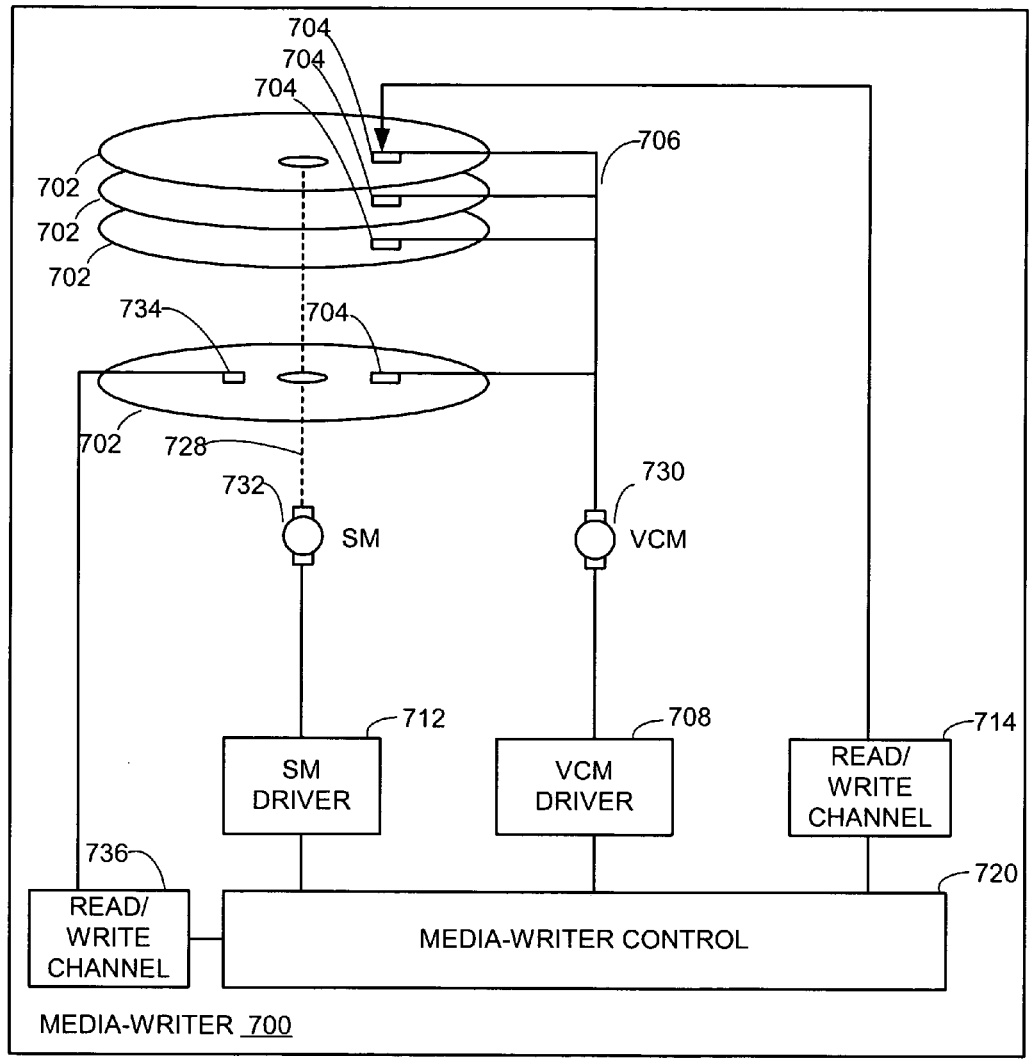
FIG. 7 is a high level block diagram of an exemplary media-writer station.

FIG. 7 is a high level block diagram of an exemplary media-writer station 700. The media-writer 700 includes an actuator assembly 706, a plurality of read/write (R/W) heads 704, a read/write (R/W) channel 714, a spindle motor (SM) 732 and a voice coil motor (VCM) 730. There can be a single RW head 704 per disk, or a RW head 704 per surface of a disk (i.e., two RW heads 704 per disk). There can be a single R/W channel, or there can be a separate R/W channel for each of the heads 704. The media-writer may also include a current pre-amplifier (not shown) between the heads 704 and each R/W channel 714. A SM driver 712 drives the SM 732, and a VCM driver 708 drives the VCM 730. Each R/W head 704 includes a write element and a read element.

A plurality of disks 702 are stacked at once on a writer spindle shaft 728, with at least one head 704 being provided for each disk 702. An air bearing may be associated with the SM 732 to obtain accurate and stable disk revolution. Similarly, an air bearing may be associated with the VCM 730 and/or actuator assembly 706. Optical sensors, or the like, can be used to accurately detect disk revolution. Alternatively, the spindle controller can detect the spindle rotation via sensing of back-EMF crossings of the open-circuit winding of the motor, as is known to one of ordinary skill in the art. Optical encoder technology, laser interferometer technology, a capacitative sensor, or the like, can be used to accurately detect the angle of the actuator assembly 706. Tilting components of the spindle 728 and actuator assembly 706 may also be controlled. It is also possible that the VCM 730 and actuator assembly 706 can be replaced with a common cartridge that is controlled by a linear motor, e.g., as described in U.S. Pat. No. 5,012,363, which is incorporated herein by reference.

A controller 720 controls the SM driver 712, the VCM driver 708, and the R/W channel 714. The controller 712 likely includes, or is in communications with, a microprocessor. The controller may include a servo controller, a phase lock loop (PLL), and other (or alternative) components for accurately controlling the rotation of the disks 702, positioning of the heads 704, and writing of servo patterns. For example, the controller may also include a stable clock system, a write pattern generator, a pattern detection unit, or the like, and other (or alternative) elements used for writing precise servo patterns on surfaces of the disk 702. Such a stable clock system may include a separate clock head 734 that flies over one of the disk surfaces and a clock read/write channel 736 to provide a coherent clock signal. The controller 720 can control the write currents provided to the write elements. An identical write current can be provided to each of the heads 704 (and more specifically to the write element on each head), or each head 704 can receive its own unique write current.

The media-writer 700 is likely sensitive to vibration, contamination, and electromagnetic interference. Accordingly, it is likely operated on a heavy granite anti-vibration table in a clean room that is itself protected from vibration and shock.

As mentioned above, the media-writer 700 can be used to write servo patterns on each disk 702 in the stack of disks 702. Each disk 702 can then removed from the media-writer 700 and placed in a separate drive containing multiple blank disks, such that the drive can use the patterned disk as a reference to re-write servo patterns on all of the other disk surfaces in the drive, as well as writing a servo pattern on the patterned surface, if desired. The media-writer 700 is a relatively expensive instrument, and it may take a relatively long time for it to write a reference pattern on the stack of disks 702. However, as mentioned above, if the stack contains many disks 702, e.g., ten disks, then the media-writer 700 can write the reference pattern for ten drives in approximately the same time that it would have taken to servowrite a single drive. It is also possible that the a media writer is used to write the final patterns on the disk surface (s). Such disks can then be placed in disk drives and used "as is" (i.e., without re-writing of servo patterns).

Figure 8A:
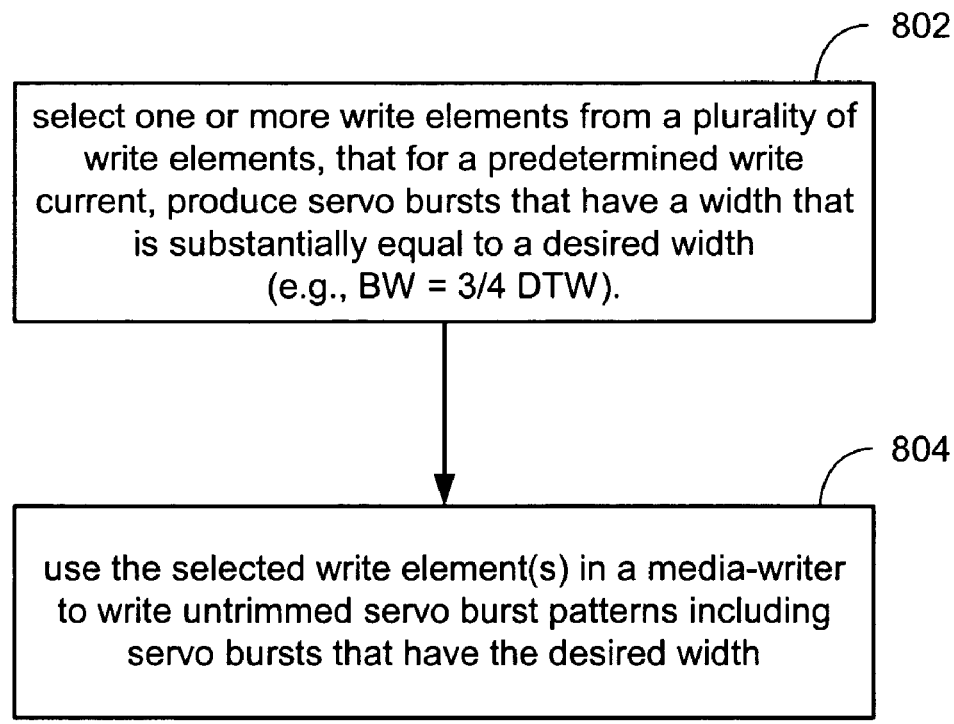
FIG. 8A is a high level flow diagram useful for describing methods of the present invention that can be used with media-writers.

Methods for using a media-writer to write servo burst patterns in accordance with embodiments of the present invention will now be summarized with reference to FIG. 8A. As shown in FIG. 8A, step 802 includes selecting one or more write elements from a plurality of write elements (e.g., selecting N elements from a plurality of M elements, where M>N), that for a predetermined write current, produce servo bursts that have a width that is substantially equal to a desired width. In accordance with specific embodiments of the present invention, the desired width is three-fourths of a desired data track width.

Step 802 can include testing the plurality of write elements by driving each write element using the predetermined current and measuring resulting burst widths, and selecting the write element(s) based on the measured burst widths. Step 802 can alternatively, or additionally, include measuring the physical width of each write element, and selecting the write element based on the measured physical widths. It is noted that the term "based on," as used herein, is open ended in that it means "based at least in part on," unless otherwise specified. For example, selecting a write element based on its width means that the write element may also be selected for other attributes in addition to its width.

Next, at step 804, the selected write element(s) is/are used in a media-writer to write untrimmed servo burst patterns including servo bursts that have the desired width. An exemplary media writer 700 was discussed above. However, the present invention is not limited to use with the exemplary media writer 700. Additional embodiments of the present invention, that can be used with a media-writer, are described below.

Figure 8B:
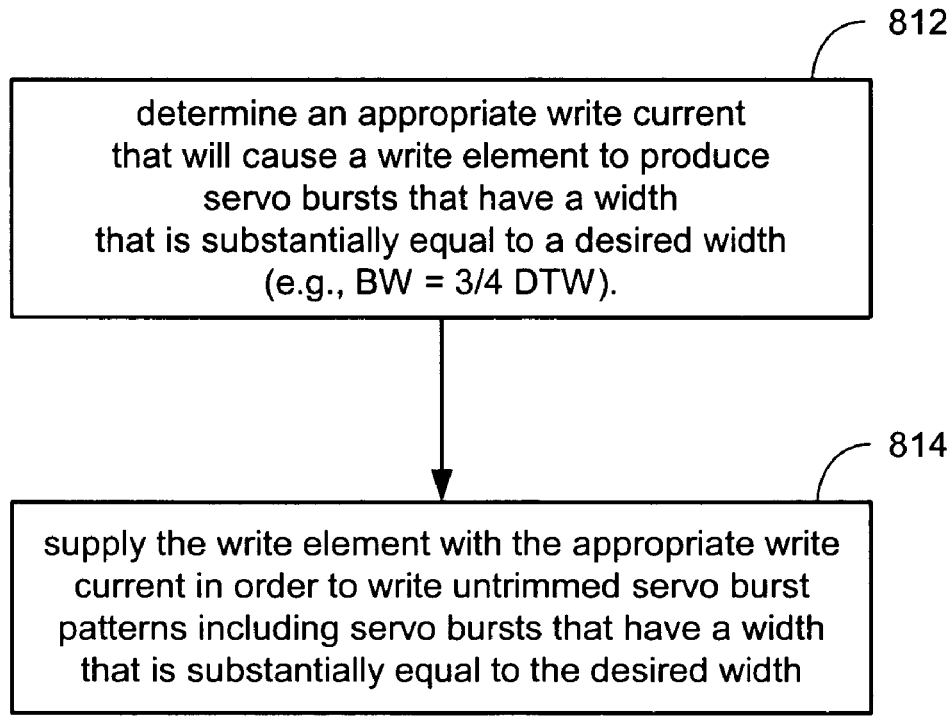
FIG. 8B is high level flow diagram useful for describing embodiments of the present invention where a write current is controlled to produce servo bursts having a desired width.

Methods for controlling write currents to produce servo bursts having a desired width will now be summarized with reference to FIG. 8B. Referring to FIG. 8B, at a step 812, there is a determination of an appropriate write current that will cause a write element to produce servo bursts that have a width that is substantially equal to a desired width. In accordance with embodiments of the present invention, the desired width is three-fourths of a data track width.

Step 812 may include performing a calibration process to obtain information that correlates burst widths with write currents for the write element. This can include, producing a calibration table that stores the information that correlates burst widths with write currents for the write element. The calibration table can then be used to determine the appropriate write current that will cause the write element to produce servo bursts that have a width that is substantially equal to three-fourths of the desired data track width. Additional details of an exemplary calibration process and table, according to embodiments of the present invention, were discussed above.

Next, at a step 814, the write element is supplied with the appropriate write current in order to write untrimmed servo burst patterns including servo bursts that have a width that is substantially equal to the desired width (e.g., three-fourths of the desired track width.). Embodiments of the present invention are also directed to combinations of the methods of FIGS. 8A and 8B. For example, the method of FIG. 8A may be used to select preferred write elements (e.g., elements that meet a high tolerance), while the method of FIG. 8B is used to fine tune the write burst width produced by each of preferred write elements. Further, it may be difficult or impossible to choose a single write element that writes desired burst widths across an entire stroke of the disk, due the changes in the angle of the write element with respect to the disk as the write element is moved along the stroke. Thus, the method of claim 8B can be used to appropriately adjust the write current for a selected preferred write element as the write element moves across the stroke of the disk.

In accordance with an embodiment of the present invention, steps 812 and 814 are performed by a media-writer. In accordance with another embodiment of the present invention, steps 812 and 814 are preformed under the control of a servowriter, at a servowriter station. In still another embodiment of the present invention, steps 812 and 814 are performed within a disk drive during self-servo writing.

Exemplary HDA at a Servowriter Station

Figure 9A:
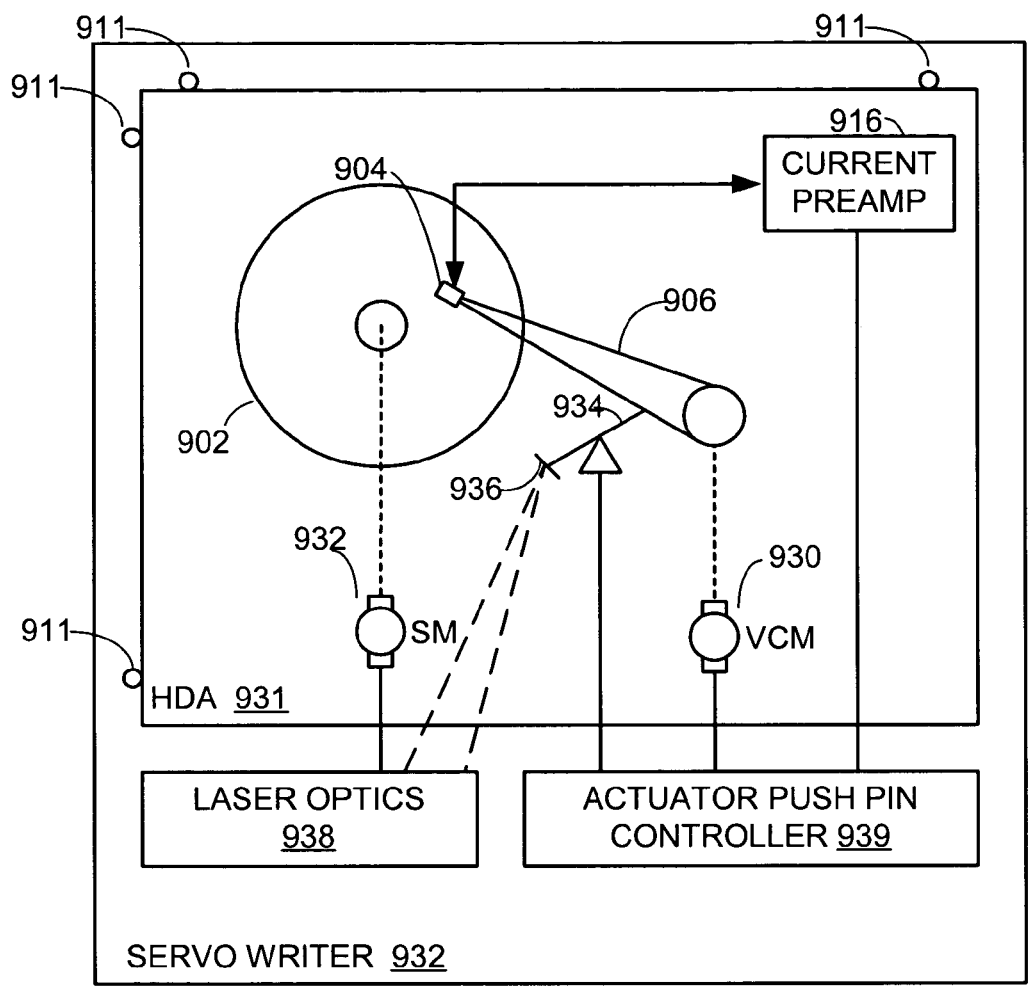
FIG. 9A is a high level block diagram of an exemplary head disk assembly located at a servowriter station.

Referring now to FIG. 9A, an exemplary HDA 931 is located at an exemplary servowriter station 932 (likely within a clean room) and placed in registration with alignment pins 911. The exemplary head disk assembly (HDA) 931 includes at least one disk 902, an actuator assembly 906, a read/write (R/W) head 904, a current pre-amplifier 916, a spindle motor (SM) 932 and a voice coil motor (VCM) 930.

The HDA 930 likely also includes an opening formed in a base wall, sidewall or cover plate for admitting a mechanical or virtual (e.g. optical) push-pin 934 of the servowriter 932. The push-pin 934 has an engagement end which engages the actuator arm 906 and another end coupled to a retro-reflector 936. The retro-reflector 936 reflects a laser beam back to a laser optics unit 938 within the servowriter 932. The laser optics unit 938 can use conventional laser interferometry techniques to determine precise relative location of the retro-reflector 936 relative to reference pins 911 and thereby indirectly determines relative position of the push-pin 934 and actuator arm 906 relative to the disk 902. This relative position information is fed into an actuator push-pin controller unit 939 which controls position of the push-pin 934 and thereby controls position of the actuator head arm 906 during servowriter aided servowriting operations. Other position system techniques are possible, such as use of an optical encoder attached to the push pin.

The servowriter 932 can control the SM 932, the VCM 930 and the R/W head 904 via current pre-amplifier 916 in order respectively to rotate the disk 902, position the actuator 906 and write and possibly check digital servo information fields and servo burst patterns on the disk(s) 902. The servowriter 932 may also include a clock head (not shown) that is inserted through an opening in the HDA 930 such that the clock head flies over one of the disk surfaces, to provide a coherent clock signal.

In accordance with an embodiment of the present invention, a servowriter (such as the servowriter 932) is used to write the final servo burst patterns shown in FIG. 3. Alternatively, the servowriter can be used to write initial reference servo burst patterns that are later used during self-servo writing to write the final servo burst patterns shown in FIG. 3.

After the servo burst pattern (final or initial) is written at the servowriter station 932, the HDA 931 is sealed relative to the ambient atmosphere (e.g., by placement of a protective stickers over the push-pin opening and a clock track head opening in the base wall, sidewall or cover plate).

Figure 9B:
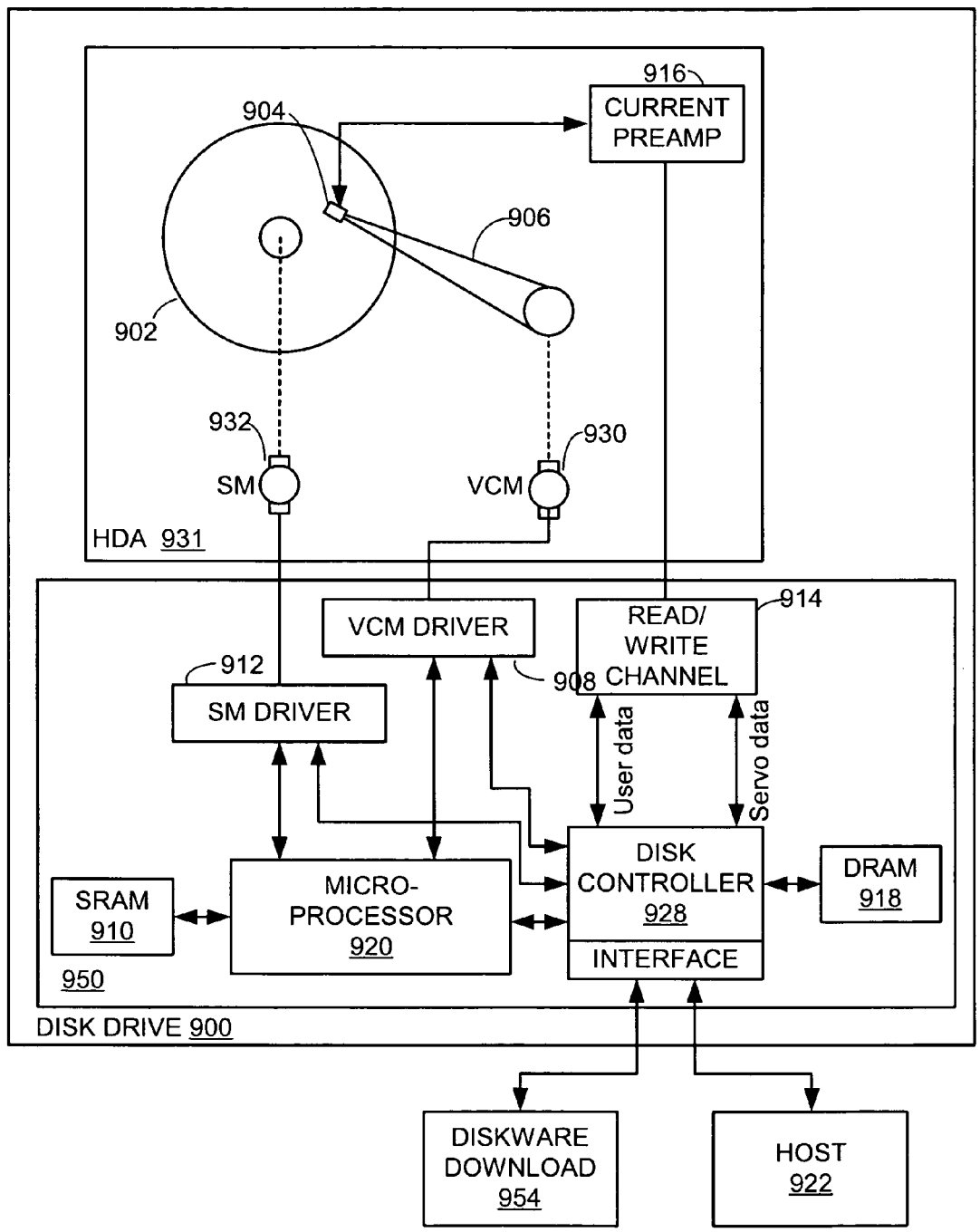
FIG. 9B is a high level block diagram of the exemplary head disk assembly of FIG. 9A, after it has been sealed and provided with a drive electronic circuit board to produce a complete disk drive assembly.

The sealed HDA 931 can then be moved (e.g., from the clean room environment) to an assembly station at which a drive circuit board 950 carrying disk drive electronics may be mounted to and electrically connected to the HDA 931, as shown in FIG. 9B, discussed below. It is also possible that a disk drive is produced without ever using a servowriting station. This is becoming more prevalent as self-servo writing is becoming the preferred scheme for writing all servo information.

Exemplary Disk Drive

Referring to FIG. 9B, a drive circuit board 950 typically includes a R/W channel 914, a SM driver 912, a VCM driver 908, a microprocessor 920, and a disk controller 928. More or fewer chips may actually be included on the board 950, depending upon the particular circuit integration at the chip/board level. Various combinations of the blocks shown in FIG. 9B may be integrated onto common chips (or onto a single chip). The drive electronics printed circuit board 950 is attached to the HDA 931 and connected to the R/W head 904 via the preamplifier 916, SM 932 and VCM 930, and the R/W channel 914 is connected to the read and write elements of the R/W head 904 via the preamplifier 916. A structurally completed hard disk drive 900 results.

The completed disk drive 900 can then moved to a self-scan unit. The self-scan unit can include a diskware download station 954 for downloading disk control software, including self-servo-write control software, from a central computer, e.g. to reserved tracks for retrieval and execution by the drive's digital controller on the circuit board 950. These reserved tracks may be completely servowritten to enable easier code writing for the completed hard disk drive 900. Alternatively, the disk control firmware can be stored in electrically programmable read only memory (not specifically shown) on the drive's circuit board 950, or it can be downloaded to the drive via a serial port facility included as an additional part of the drive electronics.

Alternatively, a special circuit board may be connected to the R/W head 904 via preamplifier 916, the SM 932, and the VCM 930. This special circuit board would typically include the functions identified in association with the disk drive product circuit board 950 shown in FIG. 9B, but would be specially adapted for drive self-servo-writing operation, and therefore typically be endowed with greater computing speed and capacity than the drive circuit board 950, enabling use of multiple self-written servo bursts and multi-rate servo pattern sampling techniques, etc., in order to self-write a final burst pattern. After the final product servo patterns are self-written, the special circuit board would be disconnected, and the drive circuit board 950 would be installed and connected, thereby completing disk drive assembly. Diskware download via the function 954 could then occur via the interface or a separate serial port of the circuit board 950, or diskware could be downloaded via the specialized circuit board. Alternatively, the circuit board 950 could be preprogrammed to contain the drive's operating firmware before being mated to a servo-written HDA.

The assembled drive 900 can remain at the self-scan station for several hours. The self-scan process may require many hours to carry out the self-servowriting processes of the present invention. In accordance with embodiments of the present invention, by the time the disk drive 900 leaves the self-scan unit, the final servo burst patterns will have been self-written to the disk(s) 902.

In accordance with an embodiment of the present invention, the final preferred servo patterns are self servo-written while the disk drive 900 is at the self-scan unit/station. More specifically, in accordance with an embodiment of the present invention, the servo burst patterns shown in FIG. 3 are written entirely during self servo-writing. Alternatively, initial reference servo burst patterns can be written by a servowriter, which are later used during self-servo writing to write the final servo burst patterns shown in FIG. 3.

Completion of the disk drive will typically also include testing of the heads, media, mechanics, etc. tuning up read-channel characteristics, as well as scanning of the disk surfaces to identify defective areas. Once the disk drive 900 is complete, the disk controller 928 can accept information from a host 922 and can control many disk functions. The host 922 can be any device, apparatus, or system capable of utilizing the disk drive 900, such as a personal computer, Web server or consumer electronics device. The disk controller 928 can include an interface controller in some embodiments for communicating with the host 922, and in other embodiments a separate interface controller can be used.

The microprocessor 920 can also include a servo system controller, which can exist as circuitry within the drive or as an algorithm resident in the microprocessor 920, or as a combination thereof. In other embodiments, an independent servo controller can be used. Additionally, the microprocessor 920 may include some amount of memory such as SRAM, or an external memory such as SRAM 910 can be coupled with the microprocessor 920. The disk controller 928 can also provide user data to the read/write channel 914, which can send signals to the current amplifier or preamp 916 to be written to the disk 902, and can send servo signals to the microprocessor 920. The disk controller 928 can also include a memory controller to interface with memory 918. Memory 918 can be DRAM, which in some embodiments, can be used as a buffer memory.

Although shown as separate components, the VCM driver 908 and spindle motor driver 912 can be combined into a single "hard disk power-chip." It is also possible to include the spindle speed control circuitry in that chip. The microprocessor 920 is shown as a single unit directly communicating with the VCM driver 908, although a separate VCM controller processor (not shown) may be used in conjunction with processor 920 to control the VCM driver 908. Further, the processor 920 can directly control the spindle motor driver 912, as shown. Alternatively, a separate spindle motor controller processor (not shown) can be used in conjunction with microprocessor 920.

A drive head position servo control loop uses the final product embedded servo patterns written to each data storage surface, and structurally includes the read element of the head 904 associated with a particular surface, the preamplifier 916, the read/write channel 914, the disk controller 928, the microprocessor 920, the VCM driver 908, the VCM 930 and the actuator assembly 906. Various analog to digital converters and digital to analog converters and other processing circuitry are also included within the head position servo control loop as is well understood by those skilled in the art and therefore not described herein in any further detail.

Although embodiments described herein refer generally to systems having a read/write head that can be used to write bursts on rotating magnetic media, other embodiments of the invention can take advantage of similar variation, such as variations in drive current or drive voltage. For example, a laser writing information to an optical media can be driven with variable power in order to increase or decrease pit width in the media in order to reduce track variation. Any media, or at least any rotating media, upon which information is written, placed, or stored, may be able to take advantage of embodiments of the invention, as variations in optical, electrical, magnetic, mechanical, and other physical systems can be made by varying a drive signal or other control mechanism in order control a write width.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed:

1. A media-writer for writing servo burst patterns on a surface of a disk for use in a disk drive, comprising:
   a write element that for a predetermined write current, produces untrimmed servo bursts tat have a width that is substantially equal to three-fourths of a desired data track width (DTW); and
   a controller to selectively provide said write current to said write element to write untrimmed servo burst patterns including untrimmed servo bursts that have a width that is substantially equal to three-fourths of the desired DTW;
   wherein the desired DTW varies for different positions along a stroke of the disk; and wherein the controller adjusts said write current provided to said write element so that the width of the untrimmed bursts are consistently substantially three-fourths of the desired DTW as the desired DTW varies along the stroke of the disk.

2. A media-writer for writing servo burst patterns on surfaces of a plurality of disks for use in disk drives, comprising:
   a plurality of (N) write elements that, for a predetermined write current each produce untrimmed servo bursts that have a width that is substantially equal to three-fourths of a desired data track width (DTW); and
   a controller to selectively provide said write currents to said plurality of (N) write elements to write untrimmed servo burst patterns, including untrimmed servo bunts that have a width that is substantially equal to three-fourths of the desired DTW, on a plurality of(N) disk surfaces.

3. The media-writer of claim 2, wherein the desired DTW is predetermined.

4. The media-writer of claim 2, wherein the desired DTW is about 0.25 μm.

5. The media-writer of claim 2, wherein the desired DTW varies for different positions along a stroke of the disk drive.

6. A media-writer for writing servo burst patterns on a surface of a disks for use in disk drives, comprising:
   a plurality of write elements, each of which can produce untrimmed servo bursts on a surface of one of the disk; and
   a controller to selectively provide a separate write current to each of said plurality write elements to thereby write untrimmed servo burst patterns including untrimmed servo bursts that have a common desired width on a surface of each of the disks.

7. A media-writer for writing information including servo burst patterns on a surface of a disk for use in a disk drive, comprising:
   a write element;
   a positioning mechanism adapted to position the write element relative to a surface of a disk; and
   a controller to control a write current applied to the write element in order to write untrimmed servo burst patterns including untrimmed servo bursts that have a width that is substantially equal to three-fourths of the desired data track width (DTW).

8. The media-writer of claim 7, further comprising a calibration table that stores information that correlates burst widths with write currents for the write element; wherein said controller uses the calibration table to determine the write current that will cause the write element to produce untrimmed servo bursts that have a width that is substantially equal to three-fourths of the desired DTW.

9. The media-writer of claim 7, wherein the positioning mechanism includes a closed loop servo system adapted to move the write element relative to the surface of the disk.

10. The media-writer of claim 7, wherein the desired DTW is predetermined.

11. The media-writer of claim 10, wherein the desired DTW is about 0.25 μm.

12. The media-writer of claim 7, wherein the desired DTW varies for different positions along a stroke of the disk drive.

13. A media-writer for writing information including servo burst patterns on a surface of a disks for use in a disk drives, comprising:
   a plurality of write elements each of which can produce untrimmed servo bursts on a surface of one of the disks;
   a positioning mechanism adapted to position the write elements relative to a surface of the disks; and
   a controller to separately control a separate write current applied to each of the plurality of write elements in order to write untrimmed servo burst patterns including untrimmed servo bursts that have a common desired width on a surface of each of the disks.

14. The media-writer of claim 13, further comprising a calibration table that stores information that correlates burst widths with write currents for each of the plurality the write elements wherein said controller uses the calibration table to determine the write current that will cause each of the write elements to produce untrimmed servo bursts that have the desired width.

15. The media-writer of claim 13, wherein the positioning mechanism includes a closed loop servo system adapted to move the write elements relative to the surface of the disk.

16. A disk drive system, comprising:
   a plurality of write elements;
   a positioning mechanism adapted to position each of the write elements relative to a surface of a corresponding one of a plurality of disks; and
   a controller to separately control a separate write current applied to each of the plurality of write elements during self-servo writing in order to write untrimmed servo burst patterns including untrimmed servo bunts that have a common width on a surface of each of the disks that is substantially equal to three-fourths of the desired data track width (DTW).

17. The disk drive system of claim 16, further comprising a calibration table that stores information tat correlates burst widths with write currents for each of the plurality of write elements; wherein said controller uses the calibration table to determine the corresponding write current that will cause each of the write elements to produce untrimmed servo bursts that have a width that is substantially equal to three-fourths of the common desired DTW.

18. The disk drive system of claim 16, wherein the positioning mechanism includes a closed loop servo system adapted to move the write elements relative to the surface of the corresponding one of the disks.

19. The disk drive of claim 16, wherein the desired DTW is predetermined.

20. The disk drive of claim 16, wherein the desired DTW is about 0.25 μm.

21. The disk drive system of claim 16, further comprising a calibration table that stores information that correlates burst widths with write currents for each of the plurality of write elements; wherein said controller uses the calibration table to determine the corresponding write current that will cause each of the write elements to produce untrimmed servo bunts that have a width tat is substantially equal to three-fourths of the common desired DTW.

22. A disk drive system, comprising:
 a plurality of write elements;
 a positioning mechanism adapted to position each of the write elements relative to a surface of a corresponding one of the plurality of disks; and
 a controller to separately control a separate write current applied to each of the write elements during self-servo writing in order to write untrimmed servo burst patterns including untrimmed servo bursts that have a common desired width on a surface of each of the disks.

23. The disk drive system of claim 22, further comprising a calibration table that stores information that correlates burst widths with write currents for each of the plurality of write elements; wherein said controller uses the calibration table to determine the corresponding write current that will cause each of the write elements to produce untrimmed servo bursts that have said common desired width.

24. The disk drive system of claim 22, wherein the positioning mechanism includes a closed loop servo system adapted to move the write elements relative to the surface of the corresponding one of the disks.

25. A system for writing servo burst patterns on a rotating media, comprising:
 a write element to write information on the rotatable media; and
 a control mechanism adapted to rotate the rotatable media and position said write element relative to the rotatable media, such that the write element:
 writes a first untrimmed servo burst having a width that is substantially equal to three-fourths of a data track width (DTW);
 writes a second untrimmed servo burst circumferentially adjacent said first servo burst, said second servo burst having an upper edge radially offset from an upper edge of said first servo burst by substantially one-half of the desired DTW, said second servo burst also having a width that is substantially equal to three-fourths of the desired DTW;
 writes a third untrimmed servo burst circumferentially adjacent said second servo burst, said third servo burst having an upper edge radially offset from the upper edge of said second servo burst by substantially one-half of the desired DTW, said third servo burst also having a width that is substantially equal to three-fourths of the desired DTW; and
 writes a fourth servo burst circumferentially adjacent said third servo burst, said fourth servo burst having an upper edge radially offset from the upper edge of said third servo burst by substantially one-half of the desired DTW, said fourth servo burst also having a width that is substantially equal to three-fourths of the desired DTW;
 wherein the desired DTW varies for different positions along a stroke of the disk; and
 wherein the control mechanism also adjusts write current provided to said write element so that the width of the untrimmed bursts are consistently substantially three-fourths of the desired DTW as the desired DTW varies along the stroke of the disk.

26. The system of claim 25, wherein said write element and said control mechanism are located within a media-writer.

27. The system of claim 25, wherein said write element is located within a head disk assembly.

28. The system of claim 27, wherein at least a portion of said control mechanism is part of a servowriter.

29. The system of claim 27, wherein said control mechanism is located within a disk drive, and wherein said first, second, third and fourth untrimmed servo bursts can be written during self-servo writing.

* * * * *

UNITED STATES PATENT AND TRADEMARK OFFICE
CERTIFICATE OF CORRECTION

PATENT NO. : 7,177,110 B2
APPLICATION NO. : 10/983448
DATED : February 13, 2007
INVENTOR(S) : Ehrlich and Schmidt It is certified that error appears in the above-identified patent and that said Letters Patent is hereby corrected as shown below:

In Claim 1, at Column 17, Line 20, replace "tat" with --that--.

In Claim 6, at Column 17, Line 55, after "surface of" delete --a--.

In Claim 6, at Column 17, Line 57, replace "disk" with --disks--.

In Claim 13, at Column 18, Line 26, replace "a disks for use in a" with --disks for use in--.

In Claim 14, at Column 18, Line 42, after "elements" insert --;--.

In Claim 16, at Column 18, Line 55, replace "bunts" with --bursts--.

In Claim 17, Column 18, Line 60, replace "tat" with --that--.

In Claim 21, Column 19, Line 15, replace "bunts" with --bursts--.

In Claim 21, Column 19, Line 15, replace "tat" with --that--.

Signed and Sealed this

Seventeenth Day of April, 2007

JON W. DUDAS
*Director of the United States Patent and Trademark Office*